United States Patent [19]

Ephraim et al.

[11] Patent Number: 4,967,649
[45] Date of Patent: Nov. 6, 1990

[54] COFFEE GRINDER

[75] Inventors: Daniel R. Ephraim, Glencoe; Philip C. Ephraim, Evanston, both of Ill.

[73] Assignee: Modern Process Equipment, Inc., Chicago, Ill.

[21] Appl. No.: 394,553

[22] Filed: Aug. 16, 1989

[51] Int. Cl.⁵ ............................................. A47J 31/42
[52] U.S. Cl. .................................... 99/286; 99/287; 241/259.1; 241/261.2
[58] Field of Search ............ 99/286, 287, 284, 290, 99/295; 241/259.1, 261.2, 261.3

[56] References Cited

U.S. PATENT DOCUMENTS 4,060,206 11/1977 Granzow ........................... 241/259.1
4,555,984 12/1985 Yamashita ............................ 99/286
4,821,966 4/1989 Ephraim et al. ...................... 241/55

OTHER PUBLICATIONS

Bunn-O-Matic Corp., Manual, Precision Coffee Grinder, Model G9, Copyright 1984—16 pages including covers.

Primary Examiner—Robert W. Jenkins
Attorney, Agent, or Firm—Dressler, Goldsmith, Shore, Sutker & Milnamow, Ltd.

[57] ABSTRACT

A coffee grinder useful in business offices or small restaurants. A hopper for coffee beans has an outlet in its lower wall. A motor is mounted vertically within the hopper. A stationary grinding burr and a rotatable grinding burr, which is driven by the motor via a vertical shaft extending through the outlet, cooperate to grind such beans into smaller grounds and to expel such grounds radially and horizontally between the burrs. A wall having an aperture surrounds the burrs and prevents such grounds from being expelled except through the aperture. A deflector mounted to the wall, outside the aperture, deflects such grounds downwardly in a concentrated stream.

9 Claims, 3 Drawing Sheets

FIG. 5
FIG. 6
FIG. 7
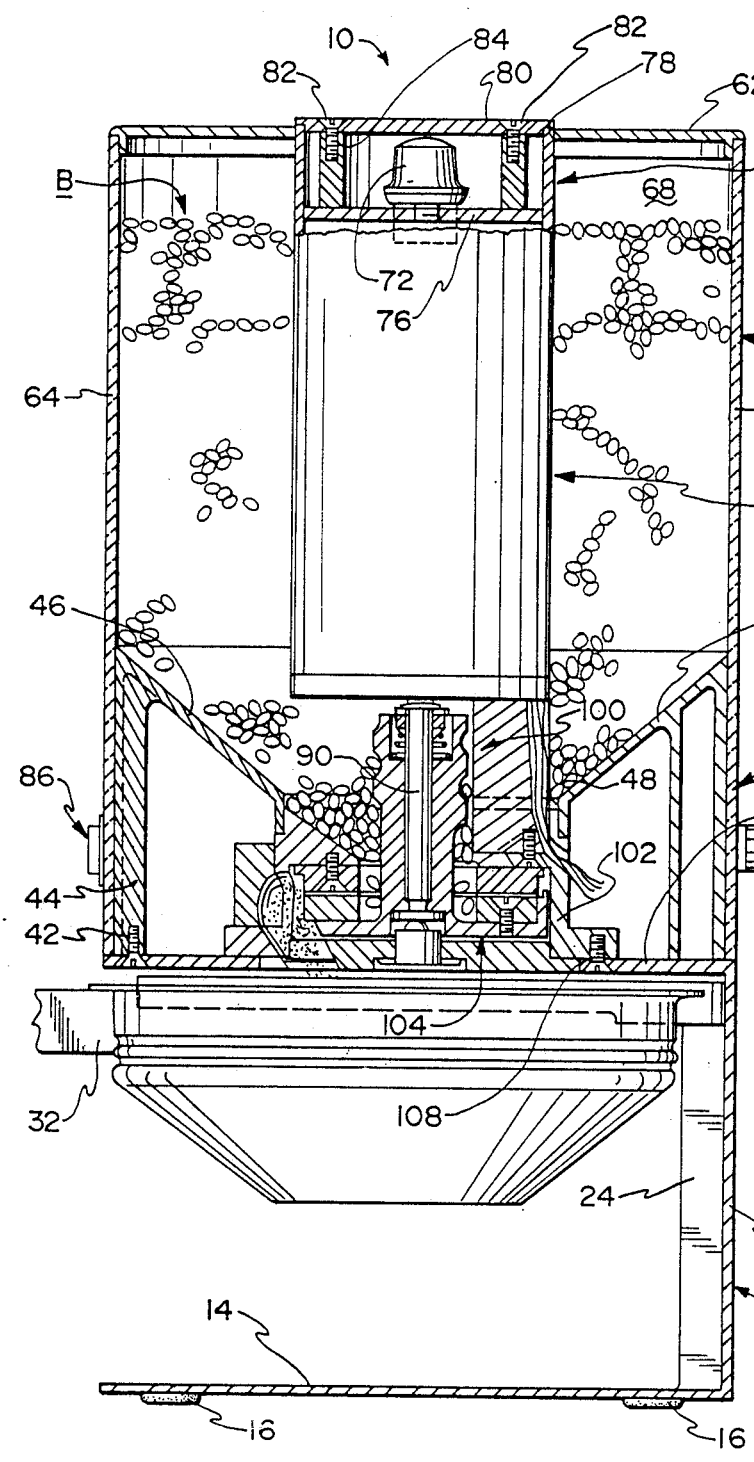
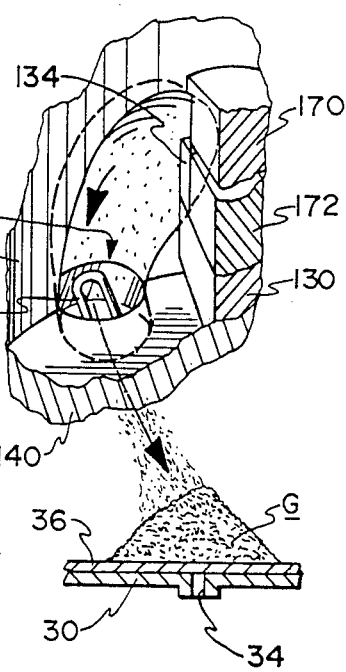
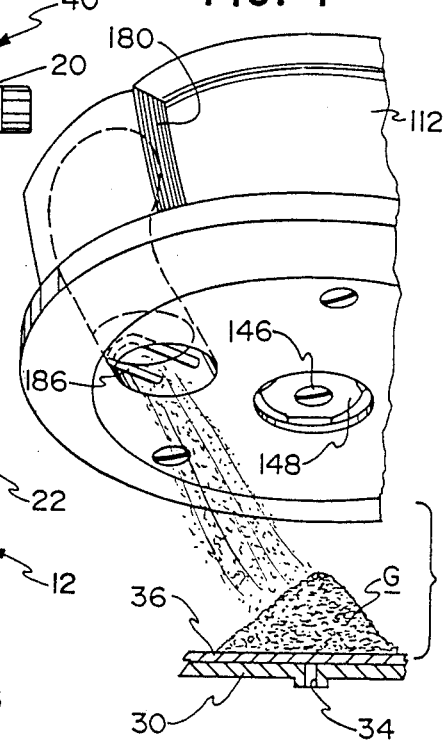

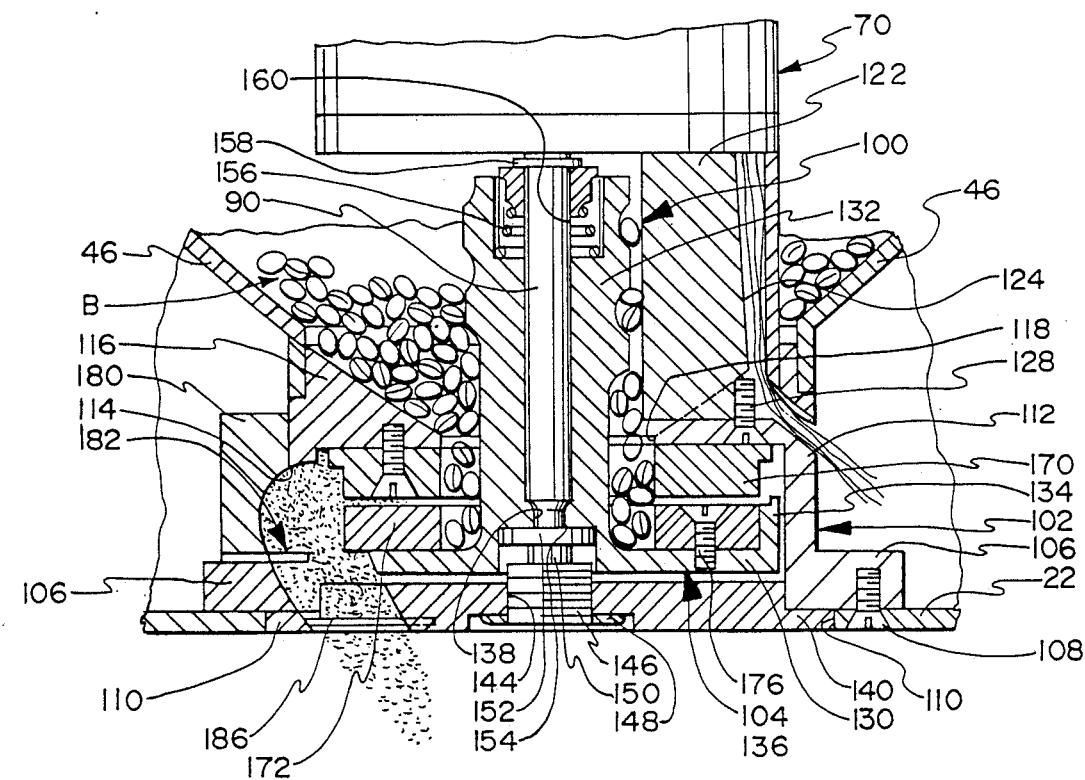

COFFEE GRINDER

TECHNICAL FIELD OF THE INVENTION

This invention pertains to an improved grinder for coffee beans. The grinder is useful in business offices, small restaurants, and other locations where counter space is limited.

BACKGROUND OF THE INVENTION

Countless numbers of compact coffee makers utilizing measured amounts of ground coffee are used in business offices, small restaurants, and other locations where counter space tends to be quite limited. Typically, such a coffee maker employs a so-called brew basket, which is lined with a porous, paper filter, and which holds a measured amount of coffee grounds. Typically, preground coffee is supplied to such locations in bulk packages, such as cans or bags, or in individual pouches containing premeasured amounts.

Many persons perceive that brewed coffee made from fresh grounds offers superior aroma, and superior taste, as compared to brewed coffee made from preground coffee. Thus, large coffee grinders are common in large restaurants, grocery stores, and other stores where coffee beans are sold. Also, small coffee grinders are common in homes. However, large coffee grinders, as used in such restaurants and stores, tend to be too large for use in business offices, small restaurants, and other locations where counter space is limited. Moreover, small coffee grinders, as used in homes, tend to be too flimsy, and too inefficient, to be very useful in such locations.

Thus, there has been a need, to which this invention is addressed, for a compact, rugged, efficient coffee grinder useful in business offices, small restaurants, and other locations where counter space tends to be quite limited.

SUMMARY OF THE INVENTION

This invention provides an improved grinder for coffee beans. The improved grinder is compact, rugged, and efficient, so as to be particularly useful in business offices, small restaurants, and other locations where counter space tends to be quite limited.

The improved grinder comprises a hopper, which is adapted to hold a supply of coffee beans. The hopper has a bottom wall with an outlet, through which such beans can be vertically fed from the hopper.

A motor is mounted vertically within the hopper. The motor is substantially enclosed by the hopper. Thus, when the hopper is substantially filled with coffee beans, the motor is substantially surrounded by such beans. This is advantageous, since such beans tend to muffle noise from the motor. Moreover, even when the hopper is not substantially filled, the hopper tends to muffle such noise.

The improved grinder also comprises means driven by the motor for grinding such beans into smaller grounds. The grinding means defines a coffee bean-receiving zone, which is disposed to receive such beans as such beans are fed vertically through the outlet of the hopper.

The grinding means comprises a pair of grinding burrs, which are mounted around the coffee bean-receiving zone, in axially spaced relation to each other, for relative rotation of the burrs about the vertical axis. The burrs cooperate to grind such beans into smaller grounds, after such beans have been received in the coffee bean-receiving zone, and to expel such grounds radially and horizontally between the burrs.

The grinding means also comprises means for deflecting such radially and horizontally expelled grounds downwardly in a concentrated stream. Preferably, the deflecting means is arranged to deflect such radially and horizontally expelled grounds downwardly in a concentrated stream tending to intersect the vertical axis noted above.

In a preferred embodiment, grinding means also comprises a rotor, which is coaxial with the vertical axis noted above. The rotor is arranged to be rotatably driven about such axis by the motor. The rotor is connected to one such burr for conjoint rotation with the same burr. Preferably, the other burr is stationary. The rotor is adapted to sweep such radially and horizontally expelled grounds toward the deflecting means.

In the preferred embodiment, the deflecting means comprises a wall and a deflector. The wall, which has an aperture, surrounds the burrs with sufficient clearance to permit relative rotation of the burrs. The wall is arranged to confine such radially and horizontally expelled grounds except at the aperture. The deflector, which is mounted to the wall, is adapted to deflect such radially and horizontally deflected grounds downwardly in a concentrated stream.

Preferably, the grinder also comprises means for feeding coffee beans downwardly from the hopper, into the coffee bean-receiving zone, and between the burrs. Preferably, the feeding means comprises a worm, which is formed on the rotor.

These and other objects, features, and advantages of this invention are evident from the following description of a preferred embodiment of this invention with reference to the accompanying drawings.

BRIEF DESCRIPTION OF THE DRAWINGS

FIG. 5 is a sectional view taken along line 5—5 of FIG. 2 in a direction indicated by arrows.

FIG. 6 is a greatly enlarged, fragmentary, perspective view of some internal structure of the coffee grinder.

FIG. 7 is a similarly enlarged, fragmentary, perspective view of such internal structure, as taken from a different vantage.

FIG. 8 is a similarly enlarged, sectional view of certain details, as shown in FIG. 5.

FIG. 9 is a partly fragmentary sectional view taken along line 9—9 of FIG. 8 in a direction indicated by arrows. A rotatable grinding burr is shown fragmentarily, above a lower, disc-like portion of a rotor.

DETAILED DESCRIPTION OF PREFERRED EMBODIMENT

Figure 1:
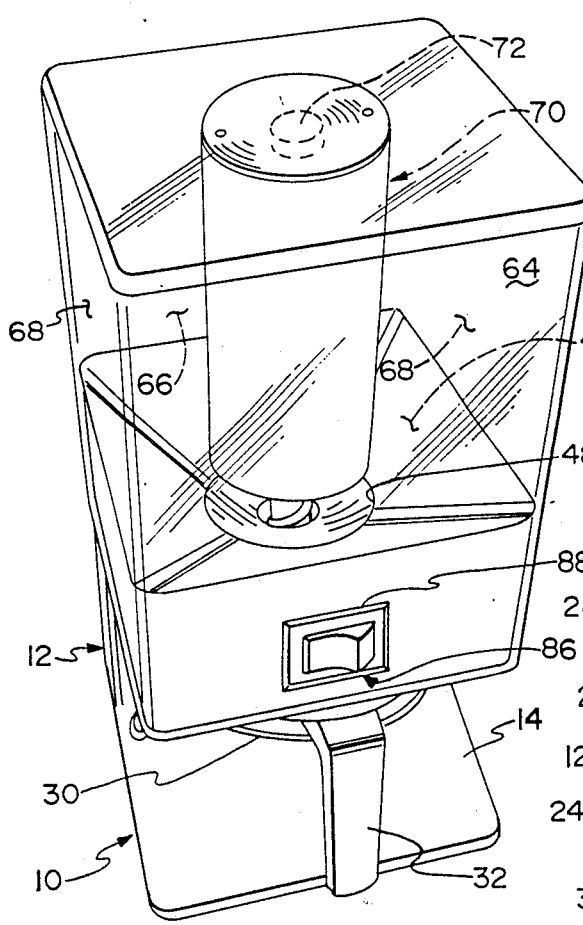
FIG. 1 is a perspective view of a coffee grinder constituting a preferred embodiment of this invention.
Figure 2:
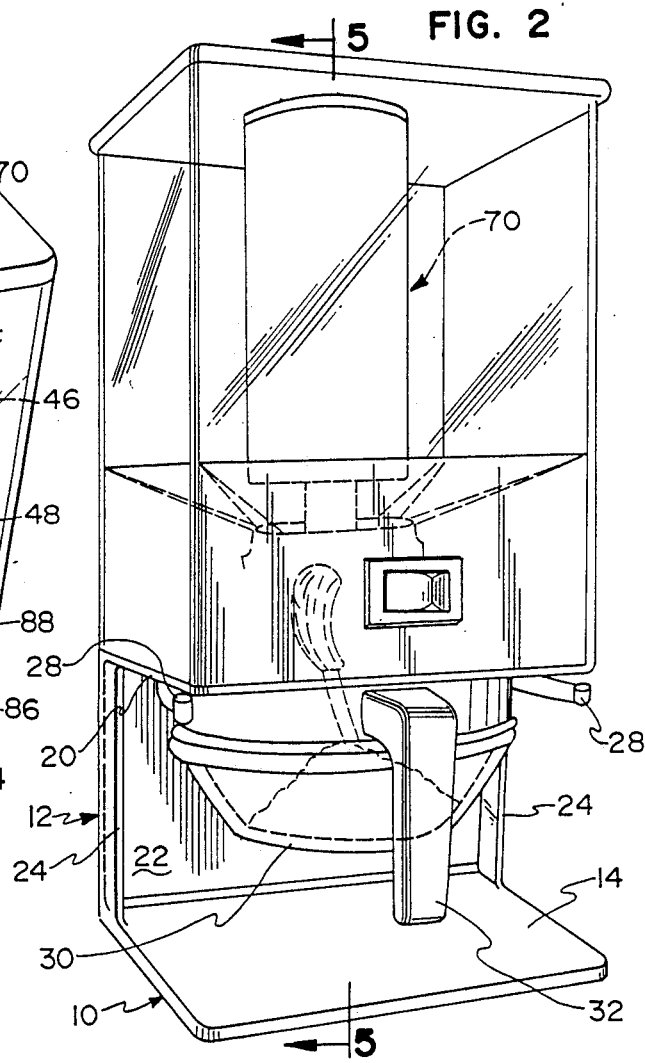
FIG. 2 is a perspective view of the coffee grinder, as taken from a different vantage.
Figure 3:
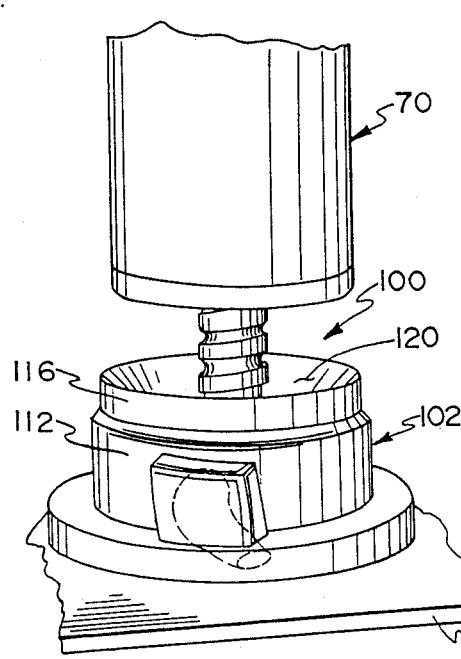
FIG. 3 is a slightly enlarged, fragmentary, perspective view of certain components of the coffee grinder.
Figure 4:
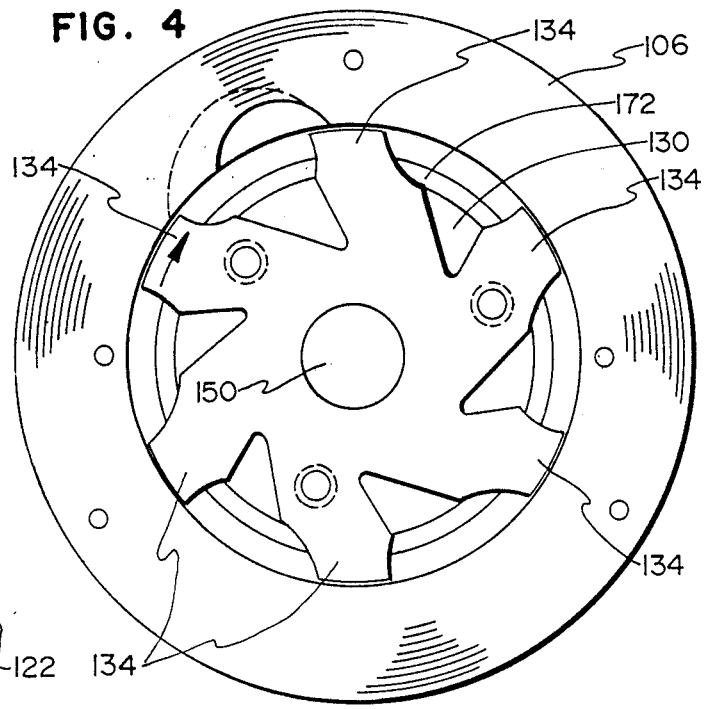
FIG. 4 is a greatly enlarged, upwardly looking, axial view of a rotor and certain related components, as used in the coffee grinder.

As shown, a coffee grinder 10 constitutes a preferred embodiment of this invention. The coffee grinder 10 is compact, upright, and rugged so as to be particularly useful in a business office or a small restaurant.

The coffee grinder 10 comprises a base 12, which is adapted to stand the coffee grinder 10 on a firm, horizontal surface (not shown) such as a counter. The base 12 includes a lower plate 14. Skid-resistant feet 16, which are attached adhesively to the underside of the lower plate 14, engage such a surface so as to restrain the coffee grinder 10 against skidding. The base 12 also include an upper plate 20, a back plate 22, and two side gussets 24. The back plate 22 and the side gussets 24 support the upper plate 20 above the lower plate 14.

Two clamping arms 28 of a known type are mounted to the underside of the upper plate 22. The clamping arms 28 are used to clamp a so-called brew basket 30 of a known type removably beneath the upper plate 20. The brew basket 30 receives coffee grounds G from a grinding mechanism to be later described. The brew basket 30 is designed to fit a variety of so-called drip coffeemakers (not shown) of known types used in business offices and elsewhere. The brew basket 30 has a handle 32 enabling the brew basket 30 to be easily manipulated. The brew basket 30 has a central aperture 34 to allow brewed coffee to drip from the brew basket 30. When the brew basket 30 is used, it is lined with a porous, paper filter 36, onto which coffee grounds G are directed by the grinding mechanism. Further details of the clamping arms 28 and the brew basket 30 are unnecessary herein, since they are known components.

A box-like structure 40 is supported on the upper plate 20. The structure 40 is fastened to the upper plate 20 by screws 42 (one shown) at peripheral ears 44 (one shown) formed within the structure 40. The structure 40 has rectangular front, back, and side walls, as shown, and a top wall 46 having a large, circular, central aperture 48. The top wall 46 slopes downwardly from the upper edge of each of the front, back, and side walls of the structure 40, toward the aperture 48.

A hopper 60 for coffee beans B (see FIG. 5) is supported on the upper plate 22. The hopper 60 has a removable cover 62. The hopper 60 is adapted to hold a supply of coffee beans B and to be substantially filled with such beans.

A front wall 64, a back wall 66, and two side walls 68 are made, as a single piece as shown, from a suitable, transparent, polymeric material, such as polycarbonate. The cover 62 is made from similar material. Lower portions of the front wall 64, the back wall 66, and the side walls 68 engage the upper plate 20 and cover the front, back, and side walls of the structure 40. Alternatively, the front wall 64, the back wall 66, and the side walls 68 may terminate at an upper edge of the structure 40, which then forms a lower part of the hopper 60. The front wall 64, the back wall 66, and the side walls 68 are attached suitably to the structure 40. Upper portions of the front wall 64, the back wall 66, and the side walls 68 extend above the top wall 46 of the structure 40 and define the front, back, and side walls of the hopper 60. The top wall 46 of the structure 40 defines a substantial part of the bottom wall of the hopper 60. The remaining part of the bottom wall of the hopper 60 is defined by a part of the grinding mechanism to be later described.

An electrical motor 70 of a known type used in coffee grinders is mounted vertically within the hopper 60. Thus, the motor 70 is substantially surrounded by coffee beans B when the hopper 60 is substantially filled with such beans, which then tend to muffle noise from the motor 70. Moreover, because the motor 70 is not mounted externally, the coffee grinder 10 is permitted to be more compact, as compared to other coffee grinders (not shown) of similar capacity.

The motor 70 incorporates a timer (not shown) of a known type. The timer is adjustable over a range of possible periods, e.g., from 30 seconds to 90 seconds, via a knob 72. The knob 72 is mounted operatively in a cylindrical enclosure 74, which is integral with an upper end 76 of the motor 70. The cylindrical enclosure 74 extends through a large, circular, central aperture 78 in the removable cover 62, which fits loosely around the cylindrical enclosure 74. The cylindrical enclosure 74 has a removable cover 80, which is attached removably by screws 82 to posts 84 extending upwardly from the motor 70. Removal of the cover 80 permits access to the knob 72.

The motor 70 is actuatable via a switch 86 of a known type. The switch 86, which is mounted on the front wall of the structure 40, extends outwardly through an aperture 88 in the lower portion of the front wall 64 covering the front wall of the structure 40. When the motor 70 is actuated, it operates for the period to which the timer has been adjusted, e.g., 60 seconds, whereupon the motor 70 is deactuated by the timer. The switch 86 may be manually actuated so as to override the timer. Further details of the timer, the knob 72, and the switch 86 are unnecessary herein, since these are known components.

A vertical shaft 90 extends downwardly from the motor 70. The vertical shaft 90, which defines a vertical axis, is arranged to be rotatably driven about such axis by the motor 70.

A grinding mechanism 100 is mounted on the upper plate 20 of the base 12. The grinding mechanism 100 comprises a stator 102 and a rotor 104. The rotor 104 is driven by the motor 70, via the shaft 90, in a manner to be hereinafter described.

The stator 102 is fastened at a lower flange 106 thereof on the upper plate 20 by screws 108 (one shown) at the margin of a large, circular, central aperture 112 in such plate 22. The stator 102 has an annular wall 112, which has a specially shaped aperture 114. The stator 102 has an upper, annular, bowl-like portion 116, which is integral with the wall 110. Such portion 116, which extends radially inwardly from the wall 112, has a central aperture 118.

As mentioned above, the top wall 46 of the structure 40 defines a substantial part of the bottom wall of the hopper 60. The upper portion 116 of the stator 102 has a frusto-conical surface 120 extending to the central aperture 118 and defining the remaining part of the bottom wall of the hopper 60. The central aperture 118 defines an outlet, from which coffee beans B can be vertically and gravitationally fed from the hopper 60.

The motor 70 is mounted on a post 122 extending upwardly from the upper portion 116 of the stator 102. The post 122 has a vertical passageway 124 guiding electrical wires 126 connected to the motor 70. Such wires 126 are shown fragmentarily. The post 122 is fastened by a screw 128 in a recess in the upper portion 116 of the stator 102.

The rotor 104 is similar to a rotor disclosed in Ephraim et al. U.S. Pat. No. 4,821,966, the disclosure of which is incorporated herein by reference. The rotor 104, has a lower, disc-like portion 130 and an upper, sleeve-like portion 132. The lower portion 130 has six circumferentially spaced, flanges 134. The upper portion 132 receives the shaft 90 and is keyed to the shaft 90, at a key 136 formed on the shaft 90 and fitted into a keyway 138 formed in the upper portion 132 of the rotor 104, for conjoint rotation of the rotor 104 and the shaft 90 and for axial movement of the rotor 104 along the shaft 90 within a limited range of axial movement.

The grinding mechanism 100 comprises a lower plate 140 fitting into the central aperture 110 of the upper plate 22 of the base 12. The plate 140 is fastened by screws (not shown) to the flange 106 of the stator 102. The plate 140 has a central aperture 144, which is threaded. A threaded stud 146 is threaded into the aperture 144, which is threaded, and is secured by an external nut 148.

A small thrust bearing 150 is mounted integrally on the threaded stud 146. A large thrust bearing 152 is seated within a downwardly opening, axial socket 154 of the rotor 104, bears against the small thrust bearing 150. A coiled spring 156 is coiled around the shaft 90 between a keeper 158, which is mounted on the shaft 90, and the upper portion 132 of the rotor 104. The coiled spring 156 is seated within an upwardly opening, axial socket 160 in the upper portion 132 of the rotor 104. The coiled spring 156 biases the rotor 104 downwardly along the shaft 90.

The grinding mechanism 100 comprises a pair of annular grinding burrs of known types used in coffee grinders, namely a stationary grinding burr 170 and a rotatable grinding burr 172. The pair of annular grinding burrs is similar to a pair of annular grinding burrs disclosed in the Ephraim et al. patent noted above.

The grinding burrs 170, 172, are mounted in axially spaced relation to each other, for relative rotation of the burrs 170, 172, about a vertical axis. The stationary grinding burr 170 is fastened by screws 174 (one shown) to the upper portion 116 of the stator 102. The rotatable grinding burr 172, which fits within the flanges 134, is fastened by screws 176 to the lower portion 130 of the rotor 104. Alternate ones of the flanges 134 are taller than the other flanges 134 and extend upwardly along the rotatable grinding burr 172, as exemplified by the flange 134 shown in FIG. 8.

The grinding mechanism 100 defines a coffee bean-receiving zone beneath the central aperture 118 of the upper portion 116 of the stator 102. Such zone is disposed to receive coffee beans B, as fed vertically and gravitationally from the hopper 60, through the aperture 118. The annular grinding burrs 170, 172, are mounted around such zone, through which the upper, sleeve-like portion 132 of the rotor 104 extends. The lower, disc-like portion 130 of the rotor 104 defines a bottom wall of such zone.

When the rotatable grinding burr 172 is rotated by the motor via the shaft 90 and the rotor 104, the grinding burr 170, 172, grind coffee beans B, as received in the coffee bean-receiving zone, into smaller grounds G between the grinding burrs 170, 172. Such grounds are expelled radially and horizontally between the grinding burrs 170, 172.

The grinding mechanism 100 defines a coffee grounds-receiving zone between the grinding burrs 170, 172, and the annular wall 112 of the stator 102. Such zone is disposed to receive coffee grounds G, as expelled radially and horizontally between the burrs 170, 172. Such zone is swept by the taller flanges 134 of the lower portion 130 of the rotor 104 as the rotor 104 is rotated.

As mentioned above, the annular wall 112 of the stator 102 has a large aperture 114. A block-like deflector 180 is welded to the wall 112 so as to cover the aperture 114. The deflector 180 and the wall 112 may be alternatively cast as a single piece. The deflector 180 and an adjacent portion of the lower flange 106 of the stator 102 are machined, as shown, so as to define a curved chute 182 continuing from the aperture 114 and opening into a circular aperture 184, which is formed in the plate 140. A wire guard 186, which is U-shaped, is driven into suitable holes in the plate 140 so as to cross the aperture 184. The guard 186 prevents someone from inserting his or her finger upwardly through the aperture 184.

The curved chute 182 is adapted to deflect coffee grounds G, as expelled and swept through the aperture 114, downwardly in a concentrated stream. As shown, such grounds are deflected downwardly in a concentrated stream tending to intersect the vertical axis of the shaft 90, the rotor 104, and the grinding burrs 170, 172. Thus, such grounds tend to form a pile in a central portion of the brew basket 30, which is lined with the porous, paper filter 36. It is desirable for such grounds to form a pile in the central portion of the brew basket 30, rather than at a peripheral portion of the brew basket 30. The brew basket 30 is adapted to be then removed for insertion with collected grounds into a coffeemaker (not shown) of a known type.

Various modifications may be made in the coffee grinder described above without departing from the scope and spirit of this invention.

We claim:

1. A grinder for grinding coffee beans into smaller grounds, the grinder comprising:
   (a) a hopper adapted to hold a supply of coffee beans, the hopper having a bottom wall with an outlet, through which such beans can be vertically fed from the hopper;
   (b) a motor mounted vertically within the hopper so as to be substantially enclosed by the hopper, and so as to be substantially surrounded by such beans when the hopper is substantially filed with such beans; and
   (c) grinding means for grinding such beans into smaller grounds, the grinding means being driven by the motor, the grinding means defining a coffee bean-receiving zone, which is disposed to receive such beans as such beans are fed vertically through the outlet of the hopper, the grinding means comprising:
      (1) a pair of grinding burrs mounted around the coffee bean-receiving zone, in axially spaced relation to each other, for relative rotation of said burrs about a vertical axis, said burrs cooperating to grind such beans into smaller grounds, after such beans have been received in the coffee bean-receiving zone, and to expel such grounds radially and horizontally between said burrs; and
      (2) deflecting means for deflecting such radially and horizontally expelled grounds downwardly in a concentrated stream.

2. The grinder of claim 1 wherein the grinding means further comprises a rotor coaxial with the vertical axis defined by said burrs, said rotor being arranged to be rotatably driven about said axis by the motor and being connected to one said burr for conjoint rotation with said one burr, said rotor being adapted to sweep such radially and horizontally expelled burrs toward the deflecting means, 3. The grinder of claim 2 wherein the other burr is stationary.

4. The grinder of claim 2 wherein the grinding means further comprises feeding means for feeding such beans downwardly from the hopper, into the coffee bean-receiving zone, and between said burrs.

5. The grinder of claim 4 wherein the feeding means comprises a worm formed on the rotor.

6. The grinder of claim 2 wherein the deflecting means comprises a wall having an aperture and surrounding said burrs with sufficient clearance to permit relative rotation of said burrs, the wall being arranged to confine such radially and horizontally grounds except at the aperture, through which said rotor is adapted to sweep such grounds confined by the wall, the deflecting means further comprising a deflector mounted to the wall and adapted to deflect such grounds, as swept through the aperture, downwardly in a concentrated stream.

7. The grinder of claim 6 wherein the deflector is arranged to deflect such grounds, as swept through the aperture, downwardly in a concentrated stream tending to intersect the vertical axis.

8. The grinder of claim 1 wherein the deflecting means is arranged to deflect such radially and horizontally expelled grounds downwardly in a concentrated stream tending to intersect the vertical axis defined by said burrs.

9. The grinder of claim 1, further including a base mounting said hopper and means for removably securing a brew basket beneath said deflecting means, and a brew basket adaptable to be removed for insertion with collected grounds into a coffeemaker.

* * * * *

UNITED STATES PATENT AND TRADEMARK OFFICE
CERTIFICATE OF CORRECTION

PATENT NO. : 4,967,649

DATED : November 6, 1990

INVENTOR(S) : Daniel R. Ephraim and Philip C. Ephraim

It is certified that error appears in the above-identified patent and that said Letters Patent is hereby corrected as shown below:

Column 4, line 40, "112" should be --110--

Column 4, line 40, "22" should be --20--

Column 4, line 43, "110" should be --112--

Column 6, line 39, "filed" should be --filled--.

Signed and Sealed this

Seventh Day of April, 1992

Attest:

HARRY F. MANBECK, JR.

*Attesting Officer*  *Commissioner of Patents and Trademarks*